United States Patent [19]

Kurakake

[11] Patent Number: 4,462,086
[45] Date of Patent: Jul. 24, 1984

[54] LOADING SYSTEM IN NUMERICAL CONTROLLER

[75] Inventor: Mitsuo Kurakake, Hino, Japan

[73] Assignee: Fanuc Ltd., Tokyo, Japan

[21] Appl. No.: 385,392

[22] PCT Filed: Sep. 21, 1981

[86] PCT No.: PCT/JP81/00245
§ 371 Date: May 26, 1982
§ 102(e) Date: May 26, 1982

[87] PCT Pub. No.: WO82/01265
PCT Pub. Date: Apr. 15, 1982

[30] Foreign Application Priority Data
Sep. 30, 1980 [JP] Japan .................. 55-136468

[51] Int. Cl.³ .................. G06F 1/00; G05B 19/18
[52] U.S. Cl. .................. 364/900
[58] Field of Search .... 364/200 MS File, 900 MS file

[56] References Cited
U.S. PATENT DOCUMENTS
4,138,718  2/1979  Toke et al. .................. 364/900

Primary Examiner—Raulfe B. Zache
Attorney, Agent, or Firm—Staas & Halsey

[57] ABSTRACT

A loading system for a numerical controller which employs both a main processor and a sub-processor to ease the load on the main processor. The loading system transfers a control program stored in a nonvolatile memory to a RAM using a loading program which is stored in a ROM incorporated in the sub-processor, whereby the circuit arrangement is simplified and the cost of hardware is reduced. At the time of starting the numerical controller, the main processor reads out a loading program from the ROM of the sub-processor and transfers it to the RAM for storage. The loading program thus transferred is executed by the main processor, by which a control program stored in the nonvolatile memory is transferred to the RAM, completing the loading operation.

1 Claim, 1 Drawing Figure

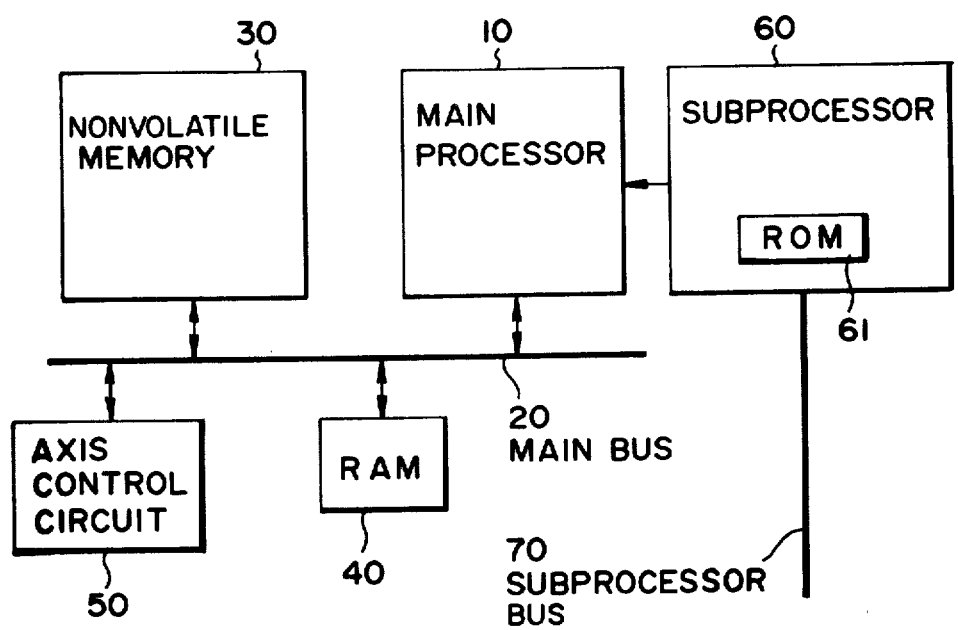

LOADING SYSTEM IN NUMERICAL CONTROLLER

BACKGROUND OF THE INVENTION

1. Field of the Invention:

The present invention relates to improvements in a loading system in a numerical controller which transfers a control program stored in a nonvolatile memory to a RAM provided on the side of a system.

2. Description of the Prior Art:

Loading has been carried out by storing a loading program in an exclusive ROM therefor and executing the program by a main processor. With this system, however, since the exclusive ROM is required in the numerical controller employing the loading system, the number of parts used increases, resulting in the defects of complex circuit construction and raised cost of hardware.

SUMMARY OF THE INVENTION

The present invention is intended to overcome such defects of the prior art, and has for its object to simplify the circuit arrangement and hence reduce the cost of hardware by storing the loading program in a ROM incorporated in a microprocessor which has recently been used for easing the load on the main processor.

BRIEF DESCRIPTION OF THE DRAWINGS

The accompanying drawing is a block diagram illustrating the principal part of a numerical controller embodying the present invention.

DESCRIPTION OF THE PREFERRED EMBODIMENT

The invention will hereinafter be described in detail with respect to the following embodiment.

The accompanying drawing is a block diagram illustrating, by way of example, the principal part of a numerical controller embodying the present invention. Reference numeral 10 indicates a main processor, 20 a main bus, 30 a nonvolatile memory, 40 a RAM, 50 an axis control circuit, 60 a microprocessor or sub-processor, 61 a ROM incorporated in it, and 70 a bus of the sub-processor.

In the accompanying drawing, the main processor 10 is a processor which carries out data processing for numerical control and, as is well known, it performs arithmetic processing of data of the RAM 40 and so on following a control program and applies the results of the processing to the axis control circuit 50 to execute predetermined numerical control.

The nonvolatile memory 30 is a memory which stores the above-said control program for performing the numerical control function, and it is connected to the main bus 20 so that its contents may be read out by the main processor 10. The RAM 40 is also connected to the main bus 20 so that it is accessible from the main processor 10.

The sub-processor 60 is provided for easing the load on the main processor 10, for instance, for effecting control for each axis, a portion of position loop control and so forth, and its arrangement is what is called all in one microprocessor including a ROM. The content of an internal ROM 61 of the sub-processor 60 is so arranged as to be accessible from the main processor 10.

In the arrangement described above, according to this embodiment, a loading program is stored in the ROM 61 of the sub-processor 60. And when the power source of the numerical controller is turned ON, the main processor 10 is caused to read out the loading program in the ROM 61 and the loading program is transferred to the RAM 40, wherein it is once stored. Such a function can generally be performed by a microprogram of the processor. Next, the loading program transferred to the RAM 40 is executed by the main processor 10, by which the control program stored in the nonvolatile memory 30 is transferred to the RAM 40, thus completing the loading operation.

Incidentally, the loading can also be carried out by executing the loading program in the ROM 61 by the main processor 10 while sequentially reading it out without temporarily storing the loading program in the RAM 40. However, since the word length of the main processor 10 is generally longer than that of the sub-processor 60, for instance, twice as long, the above-said method of reading out the contents of the ROM while at the same time executing the program is defective in that the sequence becomes complex, and that the loading time becomes longer. In view of this, according to the present invention, the loading program is once stored in the RAM 40, by which loading can be effected at the same speed as in the prior art in which the loading program is stored in an exclusive ROM.

As has been described in the foregoing, according to the present invention, since the loading program is stored in the ROM in the sub-processor for easing the load on the main processor, the exclusive ROM for the loading program which was needed in the past becomes unnecessary, introducing the advantages of simplified circuit arrangement and reduced cost of hardware. Moreover, since the loading program stored in the ROM is first transferred to the RAM and then executed by the main processor, the loading speed is not lowered. Further, it is considered possible to adopt such a system of performing the loading by the sub-processor, but since the main processor generally has high-grade functions as compared with the sub-processor, the number of steps involved in the loading program can be made smaller in the present invention in which actual loading is carried out by the main processor. Accordingly, the storage capacity needed decreases, permitting effective use of the ROM incorporated in the sub-processor and reducing the loading time.

The present invention is not limited specifically to the foregoing embodiment, but other modifications and variations may be effected. For instance, in the numerical controller to which the present invention is applied, the sub-processor and the main processor may also be arranged so that they can transfer data to each other or from one to the other according to the function of the sub-processor.

I claim:

1. A loading system method for a numerical controller provided with a main processor for performing data processing for numerical control, a sub-processor for easing the load on the main processor, said sub-processor having a ROM incorporated therein, a nonvolatile memory connected to a main bus of the main processor for storing a control program, and a write/read RAM connected to the main bus of the main processor, said method comprising the steps of: storing in the ROM incorporated in the sub-processor a loading program for transferring the control program stored in the nonvolatile memory to the RAM; at the time of turning ON the numerical controller, using the main processor to read the loading program out of the ROM and then transferring the loading program to the RAM; and executing the loading program transferred to the RAM by the main processor in order to transfer the control program stored in the nonvolatile memory to the RAM.

* * * * *

UNITED STATES PATENT AND TRADEMARK OFFICE
CERTIFICATE OF CORRECTION

PATENT NO. : 4,462,086
DATED      : Jul. 24, 1984
INVENTOR(S): Kurakake

It is certified that error appears in the above-identified patent and that said Letters Patent is hereby corrected as shown below:

Front page, [73] Assignee, after "Ltd" delete ".".

Col. 1, line 60, "all in" should be --all-in- --.

*Signed and Sealed this*

*Fifteenth* Day of *January 1985*

[SEAL]

*Attest:*

*Attesting Officer*

GERALD J. MOSSINGHOFF

*Commissioner of Patents and Trademarks*